United States Patent [19]
Barrington et al.

[11] Patent Number: 5,470,459
[45] Date of Patent: Nov. 28, 1995

[54] APPARATUS AND PROCESS FOR TREATMENT OF LIQUIDS

[75] Inventors: James W. Barrington, Downey; Randy W. Masters, Walnut Creek; Mark D. Denny, Benicia, all of Calif.

[73] Assignee: Rust Industrial Services Inc., La Porte, Tex.

[21] Appl. No.: 377,655

[22] Filed: Jan. 25, 1995

Related U.S. Application Data

[60] Division of Ser. No. 151,270, Nov. 12, 1993, Pat. No. 5,425,880, which is a continuation-in-part of Ser. No. 937,367, Aug. 28, 1992, Pat. No. 5,300,232.

[51] Int. Cl.⁶ .............................. C02F 1/76; B01F 5/04; B01F 15/02
[52] U.S. Cl. ................ 210/149; 210/205; 210/199; 210/220; 366/167.1; 366/173.1
[58] Field of Search ..................... 210/205, 149, 210/199, 198.1, 220; 366/145, 148, 165, 167, 173

[56] References Cited

U.S. PATENT DOCUMENTS

| | | |
|---|---|---|
| 1,706,418 | 3/1929 | Sissom . |
| 2,126,164 | 8/1938 | Anderson . |
| 2,528,514 | 11/1950 | Harvey et al. . |
| 2,874,118 | 2/1959 | Albertsen . |
| 3,015,554 | 1/1962 | Rummel . |
| 3,067,955 | 12/1962 | Heath . |
| 3,613,723 | 10/1971 | Witt . |
| 3,808,123 | 4/1974 | Neel . |
| 3,997,437 | 12/1976 | Prince et al. . |
| 4,097,026 | 6/1978 | Haindl . |
| 4,231,874 | 11/1980 | Heiligtag . |
| 4,818,412 | 4/1989 | Conlan . |
| 5,078,921 | 1/1992 | Zipperian . |
| 5,193,976 | 3/1992 | Kolev et al. . |

*Primary Examiner*—Neil McCarthy
*Attorney, Agent, or Firm*—Banner & Allegretti, Ltd.

[57] ABSTRACT

A method and process for the treatment of liquids, comprising moving at least one injection wand into a tank containing the liquid to be treated, wherein the angle between the injection wand and the tank bottom or the angle between the injection wand and the wall of the tank can be altered, and injecting a treating solution through the injection wand to increase the reaction mixing between the injected treating solution and the liquid being treated.

12 Claims, 9 Drawing Sheets

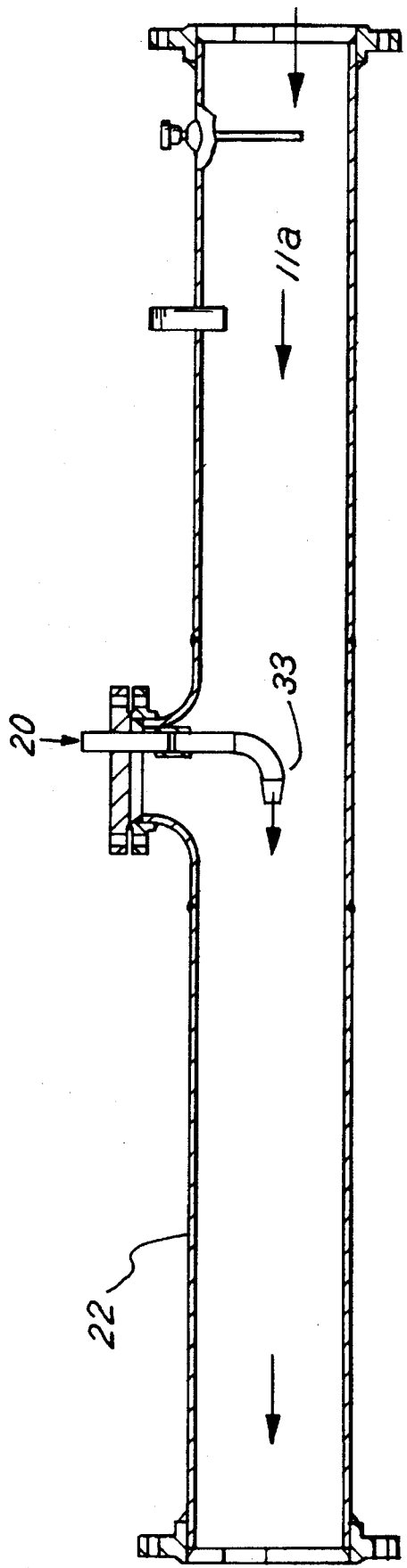

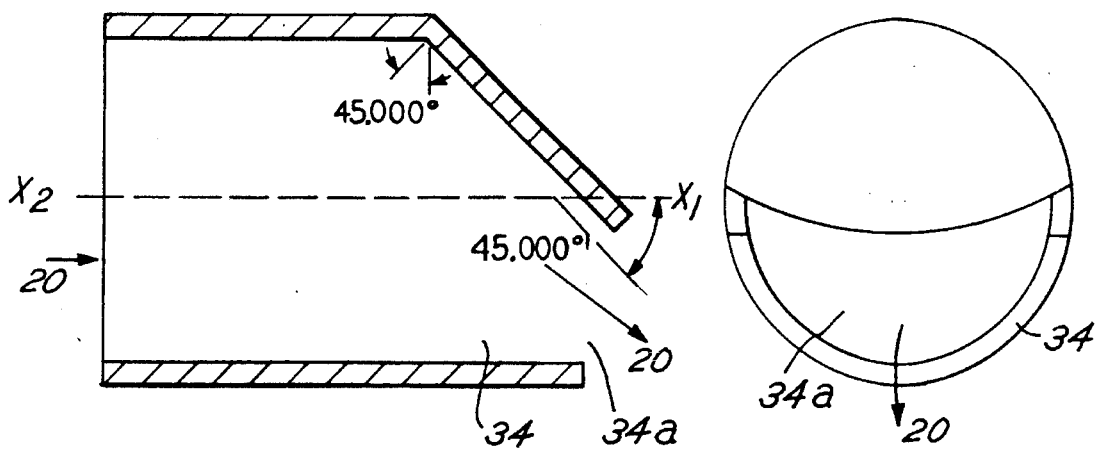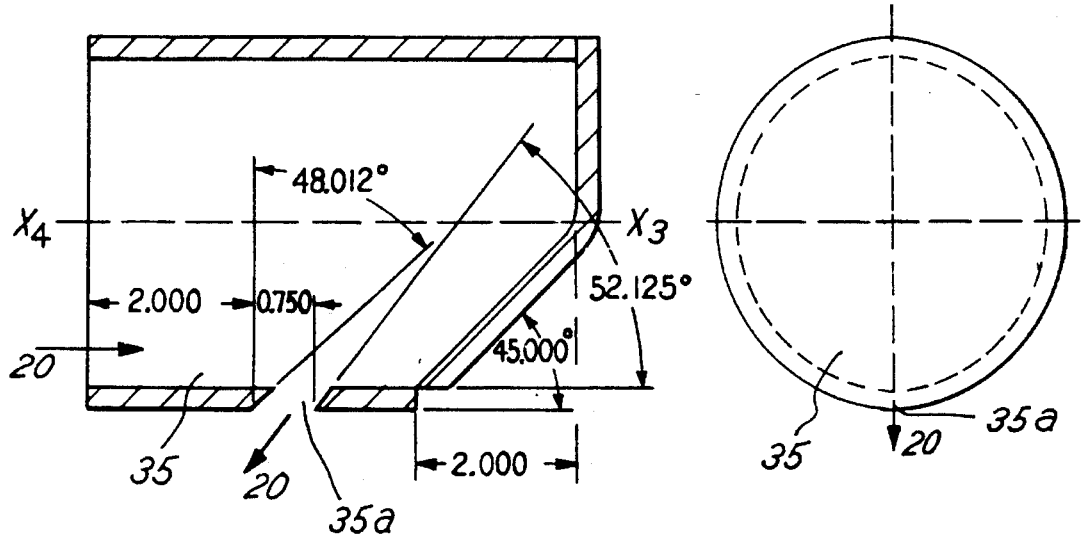

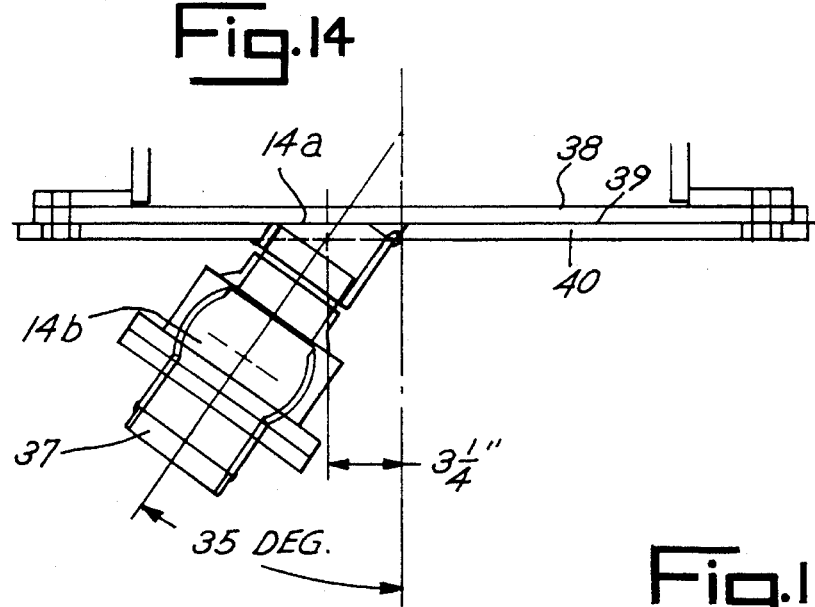
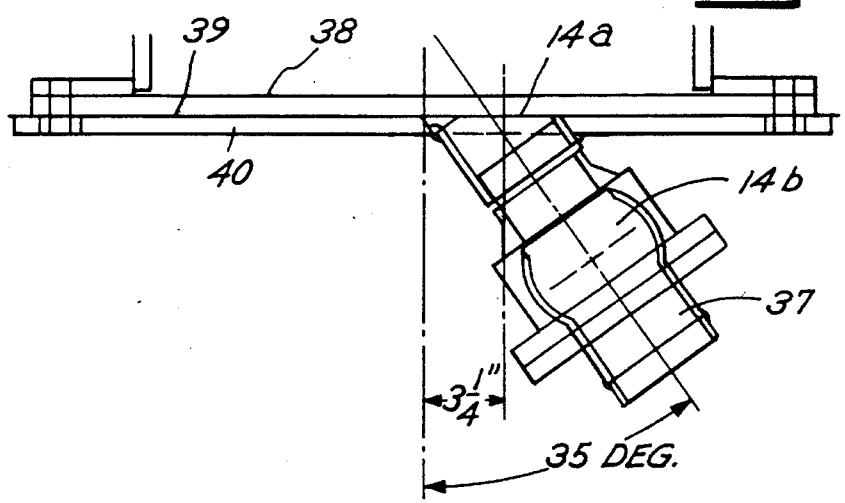
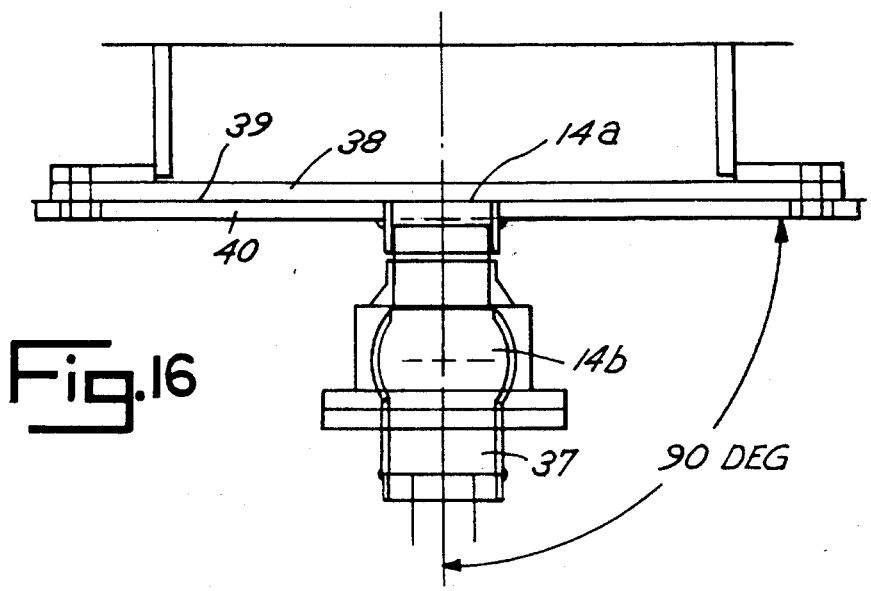

APPARATUS AND PROCESS FOR TREATMENT OF LIQUIDS

This is a divisional of application Ser. No. 08/151,270, filed Nov. 12, 1993, now U.S. Pat. No. 5,425,880 which is a continuation-in-part of application Ser. No. 07/937,367, filed Aug. 28, 1992 (issued as U.S. Pat. No. 5,300,232 on Apr. 5, 1994).

BACKGROUND AND OBJECTIVES OF THE INVENTION

The in situ treatment of liquids (including sludges and slurries) has been a long-standing problem. For example, the in situ neutralization of acidic and caustic liquids has been a longstanding problem in the chemical and oil processing industries. The present invention relates to a new method and apparatus for treating liquids (including without limitation, slurries and sludges), e.g. neutralizing acidic and caustic liquids, in a tank. More particularly, this invention pertains to the use of a unique and controlled injection method and apparatus to increase the reaction mixing between a treating solution, e.g. a neutralizing solution, and the liquid being treated, e.g. undergoing neutralization. In the preferred embodiment, radial and tangential injection wands (sometimes also called lances) are moved into a tank containing a liquid and a treating solution is injected through the injection wands into the tank. This method and apparatus permits one to take advantage of the increased mixing caused by the injection of the treating solution through the injection wands and into the tank.

In another preferred embodiment of the present invention, injection wands (or lances) are inserted at approximately the same location, e.g. a manway cover plate, into a tank containing a liquid to be treated. A treating solution is injected through the injection wands into the tank. Each injection wand is attached to a joint that allows for the angle between each wand relative to the tank bottom to be altered and/or for the angle between each wand and the wall of the tank to be altered. This embodiment also permits one to take advantage of the increased mixing caused by the injection of the treating solution through the injection wands and into the tank. The present invention may be applied in a wide range of situations, e.g. chemical neutralization or other treatment of tank contents. One example is the treatment of sour liquid, i.e., liquid that is contaminated with hydrogen sulfide ($H_2S$). Hydrogen sulfide is generated in numerous areas, e.g. oil reservoirs, oil refineries, chemical plants, and waste treatment facilities, including landfills and sanitary waste facilities. The hydrogen sulfide makes liquid "sour" and highly toxic. Any suitable treating solution, e.g. sodium hypochlorite (NaOCl), can be used to treat the sour liquid in the present invention.

The present invention is not limited to the neutralization of sour liquid, and those of skill in the art will recognize many other applications of the present invention, e.g. acid can be injected to neutralize caustics, amines can be injected to treat other sulfide contaminated materials, etc.

It is believed that the present invention can be described as a way to create and take advantage of the Coriolis force, an effect created by high velocity injection through the injection wands. In simplistic terms, Coriolis forces arise when there is radial movement of mass from one point on a rotating plane to a second point. This movement results in a change of the peripheral velocity of the mass and increases the acceleration of the mass. The acceleration of mass generates a force in the plane of rotation and perpendicular to the instantaneous radial movement. The Coriolis phenomenon can be found in nature and is associated with the earth's rotation. For example, the Coriolis force is responsible for the spinning of liquid as it is drained from an ordinary bathroom sink. In the Northern Hemisphere, the Coriolis force causes fluids in motion to spin in a clockwise direction.

The present invention is an improvement over the prior art. For example, U.S. Pat. No. 4,818,412 teaches an apparatus and process for feeding hypochlorite solution to a tank to treat sour water. However, this patent does not teach how the hypochlorite solution can be added to the sour water in a manner that creates and takes advantage of the increased reaction mixing between hydrogen sulfide (the contaminant) and the hypochlorite solution (the treating solution).

The preferred embodiment of the present invention teaches the use of a unique controlled injection method and apparatus using radial and tangential injection wands lances) that are inserted into a tank containing a liquid requiring treatment, injecting treating solution through radial injection wands to stir the liquid within the tank in a clockwise manner, and injecting treating solution through tangential injection wands to increase the reaction mixing between the liquid being treated and the treating solution, and monitoring and controlling the reaction process, thereby providing benefits that have never been attained before.

The other preferred embodiment of the present invention teaches the use of a unique controlled injection method and apparatus using injection wands (or lances) to inject treating solution into the tank to stir the liquid within the tank in a clockwise manner, and injecting treating solution into the tank to increase the reaction mixing between the liquid being treated and the treating solution, and monitoring and controlling the reaction process, thereby providing benefits that have never been attained before.

The present invention also teaches the use of unique nozzle apparatuses that promote the reaction mixing and the sweeping of particles from the bottom and walls of the tank so that the particles can become suspended in the liquid being treated and be removed from and/or treated in the tank.

SUMMARY OF THE INVENTION

The present invention not only provides for the treatment of liquids, but also provides unsurpassed advantages over the prior art. First and foremost, the new invention creates and takes advantage of increased reaction mixing by unique injection through injection wands of a treating solution into a tank containing a liquid requiring treatment. In the preferred embodiment, radial and tangential injection wands arc used, and there is at least one radial injection wand corresponding to each tangential injection wand, and they are juxtaposed by an angle.

In the preferred embodiment, the radial injection wand and/or the tangential injection wand can be moved before or during injection to alter the angle between them. Further, in the preferred embodiment, this change in angle between the injection wands can be performed using a socket type ball joint. By allowing for this, the present invention provides increased reaction mixing and increased area of contact between the treating solution and the liquid being treated. Packing glands can be used to seal the tank and allow movement of the injection wands.

The injection of the treating solution through the radial injection wands provides for increased contact between the treating solution and the liquid within the tank, as opposed to just adding the treating solution to the tank. The injection of the treating solution through the radial injection wands causes the contents of the tank to spin around the tank. In the preferred embodiment, the injection of the treating solution through the radial injection wands is performed so as to cause the tank contents to spin in a clockwise direction around the tank.

Injection of the treating solution through the tangential injection wands provides additional contact between the treating solution and the tank contents. Further, the injection through the tangential injection wands in combination with injection through radial injection wands are believed to give rise to the Coriolis effect.

In the preferred embodiment, the treating solution is injected through the tangential wands at an acute angle to the movement of the liquid as it is stirred around the tank by the radial injection wands. The increased reaction mixing between the liquid and treating solution can be used for a wide range of applications. For example, the present invention allows for increased reaction mixing between hydrogen sulfide in sour liquid and a treating solution, such as hypochlorite solution.

In another preferred embodiment, the treating solution is injected through injection wands that are inserted into the tank at approximately the same location, e.g. a manway cover plate. Each injection wand is connected to a joint that allows for the angle between the injection wand and the bottom of the tank and/or the angle between the injection wand and the wall of the tank to be altered. This embodiment also provides for increased reaction mixing between the liquid and the treating solution.

The present invention works more efficiently than prior art apparatuses or methods, such as those prior methods and apparatuses for treating sour liquid. The increased reaction mixing obtained with the present invention allows for faster and efficient treatment of liquids, e.g. the neutralization of acidic or caustic liquids. In addition, the present invention allows for the treatment of liquids so that less treating solution is required for treatment.

In the preferred embodiments, the present invention also provides for the circulation of a stream of liquid and/or any selected treating solution, and injection of that admixture through the injection wands. In the preferred embodiments, the admixture is pumped to the injection wands by at least one circulation pump. This in turn provides for intimate contact and reaction mixing between the treating solution and the circulating stream of liquid being treated. The admixture is then injected into the tank through the injection wands.

The present invention also provides a controllable, safe and predictable rate of reaction between the treating solution and the liquid requiring treatment. The present invention also provides for in situ treatment of a liquid in a closed tank under pressure, thereby eliminating and/or reducing noxious odors and air pollution.

Also, the reaction mixing provided by the wand system of the present invention maximizes the suspension of contained solids residual within the tank. By doing so, the present invention prepares the tank contents for further processing, such as ex-situ processing of tank contents, (e.g. filter press, centrifuge or other sludge dewatering apparatus). The present invention can be used in the treatment of liquids, including without limitation, slurries and sludges.

The present invention also teaches the use of unique nozzle apparatuses designed to promote reaction mixing and to sweep particles out of the bottom and walls of the tank and suspend the particles in the liquid being treated so that the particles can be treated and/or removed from the tank when the treated liquid is removed from the tank.

BRIEF DESCRIPTION OF THE DRAWINGS

FIG. 4 is a side view of the influent side of the circulation pump of the preferred embodiment of the invention.

FIG. 5 is a side view of a nozzle of an injection wand of the preferred embodiment of the invention.

FIG. 6 is an end view of the nozzle shown in FIG. 4, taken along line $X_1$–$X_2$ in FIG. 5.

FIG. 7 is a side view of another nozzle of the preferred embodiment of the invention.

FIG. 8 is an end view of the nozzle shown in FIG. 6, taken alone line $X_3$–$X_4$ in FIG. 7.

FIGS. 10 through 16 are top or plan views of another preferred embodiment of the present invention comprising injection wands, each having a flexible joint, and that are inserted through a manway cover plate into a tank.

DETAILED DESCRIPTION OF THE DRAWINGS

The following description focuses on just one of many possible applications of the present invention, i.e., the treatment of sour liquid with a treating solution, e.g. hypochlorite solution. Those of skill in the art will recognize many other applications in the neutralization or other treatment of liquids, including without limitation, slurries and sludges. For example, those of skill in the art will recognize that the present invention can be used to treat virtually any contaminated liquid with a selected treating solution(s) to react with and chemically change contaminants in the liquid thereby reducing the contaminants in the liquid.

Figure 1:
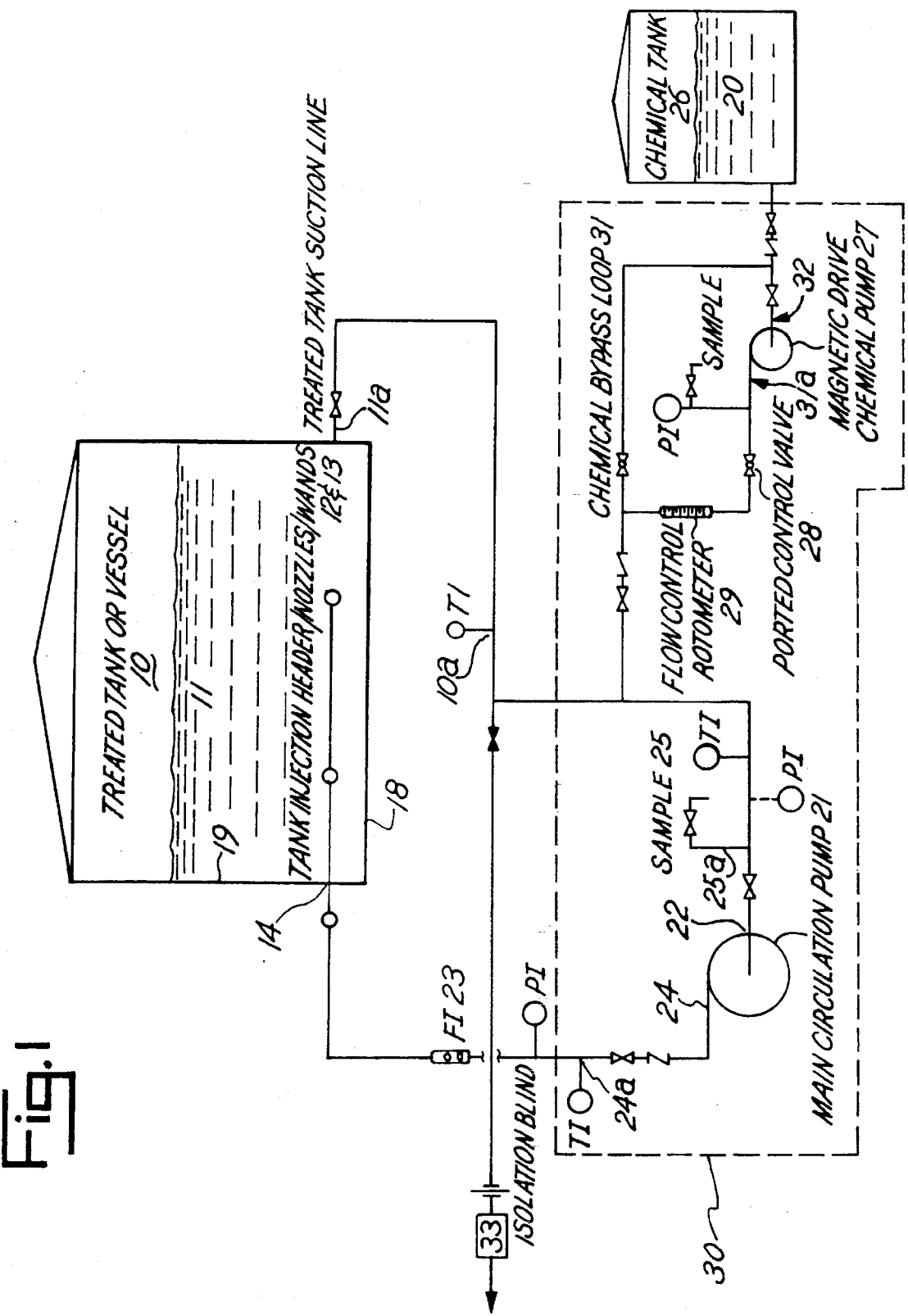
FIG. 1 is a schematic flow diagram of the preferred apparatus of the invention.

As shown in FIG. 1, in the preferred embodiment, there is a tank 10 that contains sour liquid 11 for which neutralization is desired. As shown further in FIG. 2, there is at least one radial injection wand 12 and at least one corresponding tangential injection wand 13 that are inserted in the tank 10. In the preferred embodiment, each tangential injection wand 13 is inserted into tank 10 at about the same location in tank 10 as the corresponding radial injection wand 12 and is juxtaposed at an acute angle to the corresponding radial injection wand 12. In the preferred embodiment, this angle can be altered before or during injection. Further, this change in angle between the injection wands can be performed using a socket type ball joint 14b (See FIG. 3b). The tank 10 has specially drilled openings 14a and is fitted with packing glands 14 so that the radial injection wands 12 and tangential injection wands 13 can be inserted into tank 10. Most preferably, the radial injection wands and the corresponding tangential wands are a inserted into tank 10 through the same drilled opening 14a. There may be more than one radial injection wand 12 and/or tangential injection wand 13 at each opening 14a, i.e. location of wand insertion. The tank 10 can be any size, and a tank 10 of 6 to 225 feet in diameter can be used to suitably treat liquid 11. In the preferred embodiment, there is about 5 to 10 feet of flow from each injection wand to accomplish effective scrubbing of the tank 10 bottom 18 and walls 19.

The number of wands to use in the present invention depends on the individual tank size and type of material to be treated (i.e., the chemical composition of the material and the percent liquid, solids and semi-solids). The number of wands also may depend on the overall economics involved and the degree of desired treatment.

Figure 2:
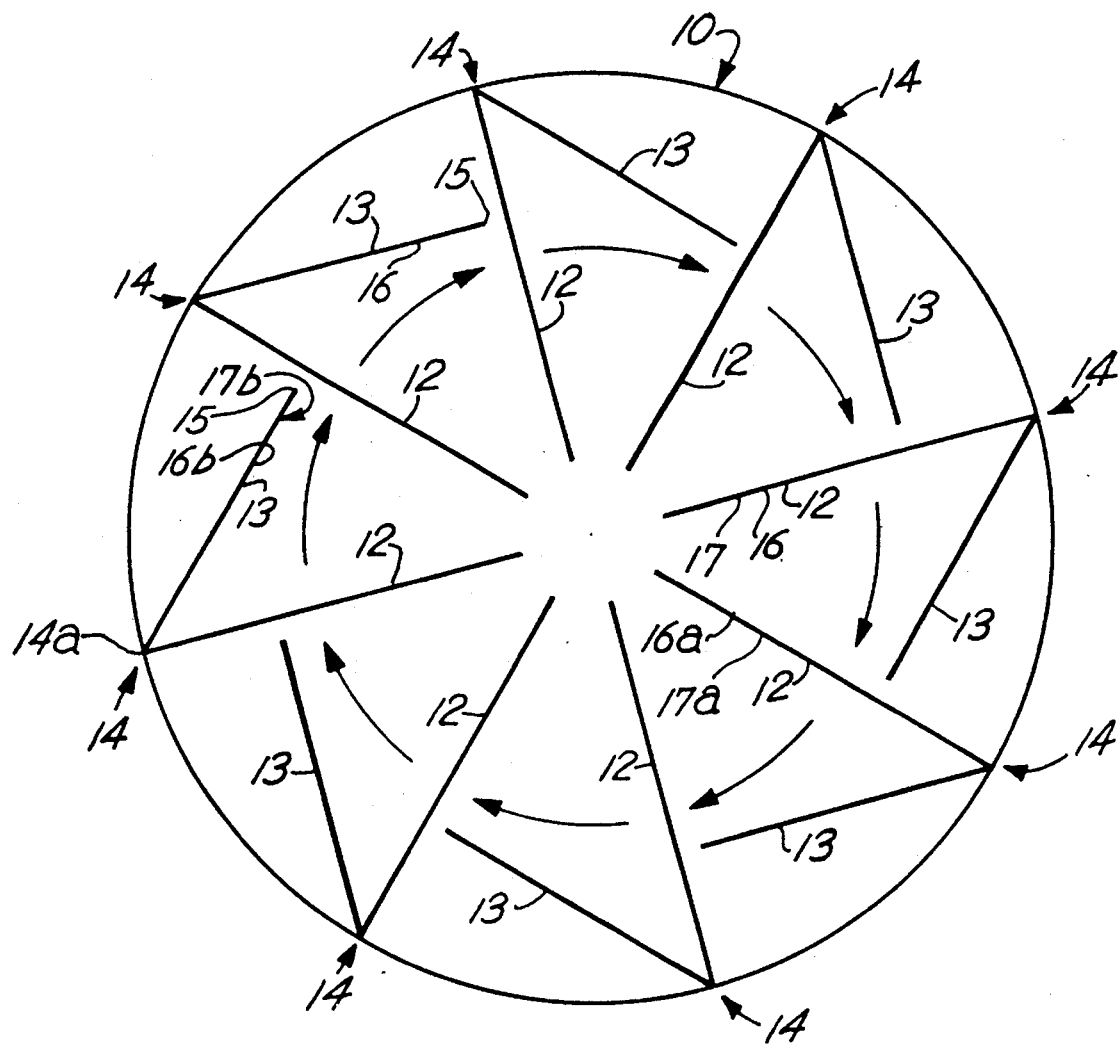
FIG. 2 is a top or plan view of injection wands inserted into a tank in the preferred embodiment of the invention.
Figure 3A:
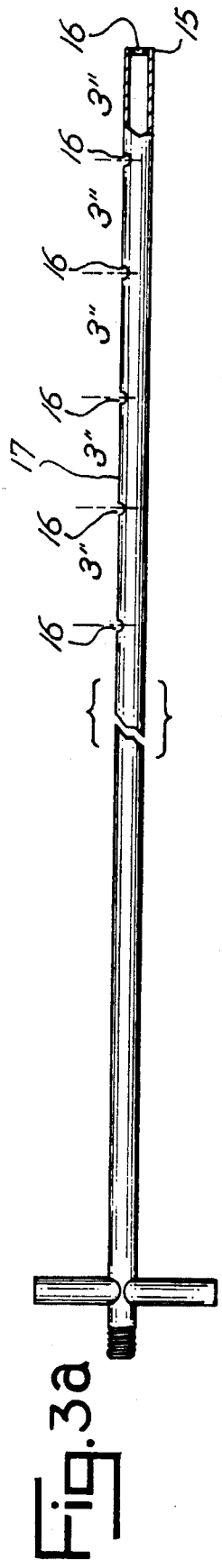
FIG. 3a is a top or plan view of a radial and a tangential injection wand of the preferred embodiment of the invention.
Figure 3B:
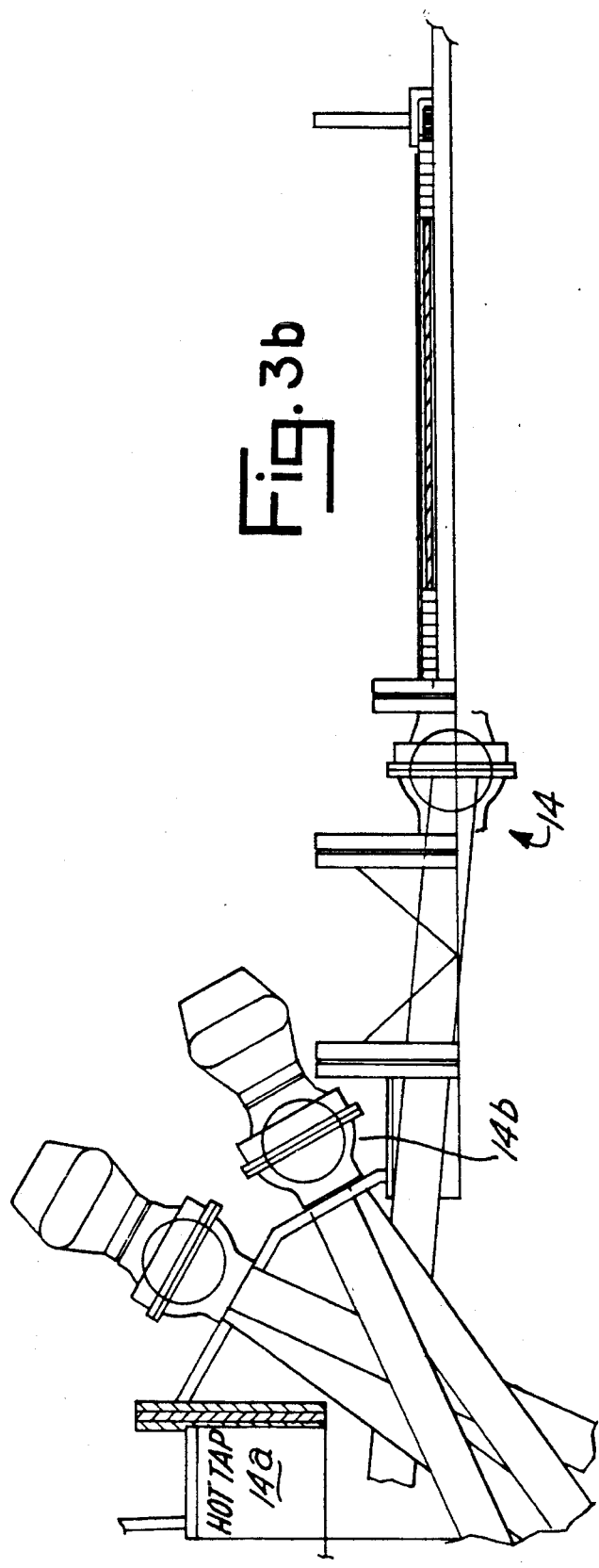
FIG. 3b is a top or plan view of radial and tangential injection wands inserted through a hot tap opening in a tank in the preferred embodiment of the invention.

As shown in FIGS. 2 and 3a, each wand has a hole 16 at the injection end 15 and holes 16 along one side 17. For the radial injection wands 12, the holes 16a are preferably placed on the side 17a that will allow injection in a clockwise manner relative to the diameter of the tank 10. For the tangential injection wands 13, the holes 16b are preferably placed on the side 17b that faces the center of the tank 10. Typically, the wands are positioned about 18 inches above the bottom 18 of the tank 10. The injection is made at sufficient pressure to keep the bottom 18 and walls 19 of the tank 10 scoured free of solids. It is desired to achieve a well mixed homogenous mixture in the tank 10 to maximize contact between the treating chemical 20 and the sour liquid 11. In the preferred embodiment for the treatment of sour liquid 11, the treating solution 20 includes sodium hypochlorite. Using sodium hypochlorite instead of a more rapid oxidizer provides for a safer and controlled treatment of the sour liquid 11, though there maybe cases where other oxidizers may be utilized.

Although only a stoichiometric amount of treating solution 20 is needed to oxidize and remove hydrogen sulfide from the sour liquid 11, other contaminants, e.g. hydrocarbons, may make it preferable that more than a stoichiometric amount of treating solution 20 be used. Empirically, it has been found that about 1 gallon of 12% hypochlorite solution is preferable to treat about 42 gallons of tank 10 contents for a typical type of sour liquid 11, e.g. sour water, that needs treatment.

As further shown in FIG. 1 of the preferred embodiment, a stream of sour liquid 11a is taken from the tank 10 and circulated through a circulation pump 21. The treating solution 20 is added at the influent or suction side 22 of the circulation pump and is mixed with the circulating stream of sour liquid 11a. The circulation pump 21 then pumps the admixture to the injection wands 12 and 13 for injection into the tank 10. The treatment of the sour liquid 11 in the tank 10 is performed at ambient temperature, and 40° F. to 110° F. is preferable and 60° F. to 80° F. is most preferable. Temperatures of less than 60° F. tend to slow the reaction of treating solution 20 and hydrogen sulfide in the sour liquid 11 and require longer treatment time. Temperatures above 110° F. give rise to hazards from vapors from hydrocarbons in the tank 10 contents being treated.

Preferably, the circulation pump 21 is operated at a rate sufficient to minimize the collection of solids on the bottom 18 of tank 10 and to maximize the percent of suspended solids in the sour liquid 11. The flow rate of the circulation pump 21 is measured by a Flow indicator 23 on the discharge side 24 of the circulation pump 21. The percent of suspended solids is determined by samples 25 taken a sample port 25a on the influent side 22 of the circulation pump 21. The samples 25 can be placed in an on-site laboratory centrifuge for gravimetric separation and analysis.

In the preferred embodiment, the treating solution 20, e.g. hypochlorite solution, is stored in a separate storage tank 26. This storage tank 26 can be of any suitable material and construction, e.g., a double walled polyethylene-lined tank.

In the preferred embodiment, after the circulation pump 21 circulates the sour liquid 11 for a sufficient time and rate so as to maximize the percent of suspended solids in the sour liquid 11, a chemical pump 27, e.g. a magnetic drive type pump, is started and operated to pump the treating solution 20 from the storage tank 26 to the influent side 22 of the circulation pump 21. Preferably, the treating solution 20 is pumped by the chemical pump 27 from the storage tank 26 to the influent side 22 of the circulation pump 21 through a ported control valve 28 and through a flow control rotameter 29. In this preferred embodiment, the chemical pump 27 only needs to overcome the head pressure in the treatment tank 10 that contains the sour liquid 11. In the preferred embodiment, about 30 psig for the chemical pump 27 discharge pressure is sufficient.

The ported control valve 28 can be manually or automatically adjusted to achieve the desired flow of treating solution 20 through the flow control rotameter 29. In the preferred embodiment, a flow rate of 2 to 20 gallons per minute of treating solution 20 into the influent side 22 of the circulation pump 21 is typical for a rate of 1,000 to 2,000 gallons per minute of circulating sour liquid 11.

The rate of injection of the treating solution 20 at the influent side 22 of the circulation pump 21 is monitored and controlled by system 30. System 30 monitors and controls the difference in temperature of the of the circulating stream of sour liquid 11a at tank outlet 10a and the admixture of circulating sour liquid 11a and treating solution 20 at point 24a, on the effluent side (discharge) 24 of the circulation pump 21, i.e. before injection of the admixture to the tank 10. In the preferred embodiment, the rate of injection of the treating solution 20 is maintained at a level so that this difference in temperature is no more than 15° F. Typically, the difference in temperature does not rise above 5° F. throughout the process because of the heat sink effect of the volume of the sour liquid 11 within tank 10. This heat sink effect is an important safety benefit of the invention. Because the treating solution 20 reacts rapidly with the hydrogen sulfide in the sour liquid 11 when treating solution 20 is hypochlorite solution, but more slowly with other sulfur bearing molecules, e.g. mercaptans or olefins, there is typically no rapid temperature rise and the large volume of sour liquid 11 in the tank 10 acts as a heat sink.

If the differential begins to be more than 15° F., the ported control valve 28 can be closed to reduce the rate of treating solution 20. In addition or alternatively, a chemical bypass loop 31 can be opened that will in turn bypass some of the treating solution 20 from the discharge side 31a of chemical pump 27 back to the suction side 32 of the chemical pump 27 and reducing the amount of treating solution 20 pumped by chemical pump 27 to the circulation pump 21.

Flow rates from the circulation pump 21 can be 2,020 gallons per minute and the pump discharge can be about 125 psig. In the preferred embodiment, it is desired to have about 5 to 10 feet of flow from each injection wand to accomplish effective scrubbing of the tank 10 bottom 18 and walls 19.

Typically, the treatment process of the present invention is run until the liquid is treated to the desired level. In the treatment of sour liquid, the process of the present invention is preferably run until the amount of hydrogen sulfide in the treated liquid is reduced to less than 5 ppm. The liquid can be further treated with flocculating compounds and filter systems 33 if desired. Typically, the treatment of a tank of sour liquid takes about 72 hours, but depends on various factors, such as the amount of hydrogen sulfide and other contaminants in the sour liquid.

As shown in FIG. 4, the treating solution 20 is added at the influent or suction side 22 of the circulation pump 21 (shown in FIG. 1) and is mixed with the circulating stream of sour liquid 11a. In the preferred embodiment, the treating solution is added via a 90° degree threaded nipple 33, so that the treating solution flows in substantially the same direction as the circulating stream of sour liquid 11a before the admixture is pumped by the circulation pump 21 (shown in FIG. 1).

As shown in FIGS. 5 through 9, the holes 16 that are shown in FIGS. 2 and 3 can alternatively be nozzles 34, 35, or 36, having narrowed outlets 34a, 35a, and 36a respectively. The narrowed outlets permit the treating solution 20 or admixture (when circulating stream 11a is added to the treating solution 20) to be injected into the tank at a higher velocity than it otherwise would be.

As shown in FIGS. 5 and 6, nozzle 34 has a 45° narrowed outlet 34a from the horizontal line $X_1$–$X_2$ such that the treating solution 20 or the admixture (when the circulating stream 11a is added to the treating solution 20) is injected into the tank in manner that acts to push or sweep the contents of the tank below the injection wands. When nozzle 34 is used in a radial injection wand, the injection of the treating solution or admixture pushes or sweeps the contents of the tank below the radial injection wand in a clockwise manner around the tank. When nozzle 34 is used in a tangential injection wand, the injection of the treating solution or admixture pushes or sweeps the contents of the tank below the tangential wand towards the center of the tank.

As shown in FIGS. 7 and 8, nozzle 35 has a 45° narrowed outlet 35a from the horizontal line $X_3$–$X_4$ such that the treating solution 20 or the admixture (when the circulating stream 11a is added to the treating solution 20) is injected into the tank in manner that acts to push or sweep the contents of the tank below the injection wands. When nozzle 35 is used in a radial injection wand, the injection of the treating solution or admixture pushes or sweeps the contents of the tank below the radial injection wand in a counter-clockwise manner. When nozzle 35 is used in a tangential wand, the injection of the treating solution or admixture pushes or sweeps the contents of the tank below the tangential wand away from the center of the tank. Nozzle 35 permits increased sweeping of the tank contents.

Figure 9:
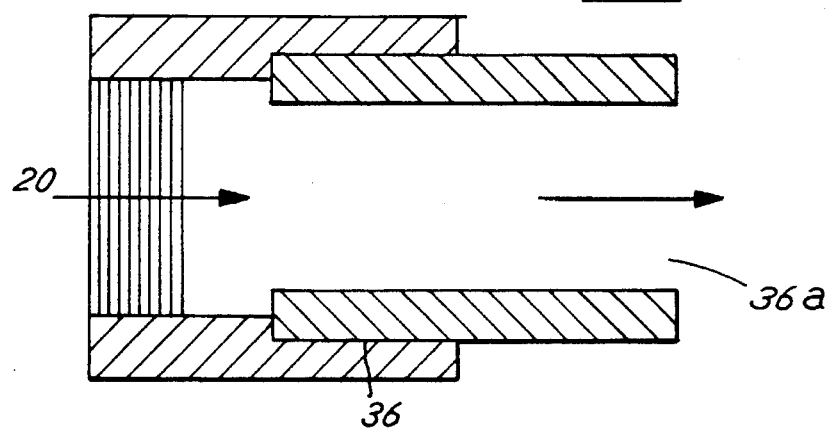
FIG. 9 is a side view of yet another nozzle of the preferred embodiment of the invention.
Figure 10:
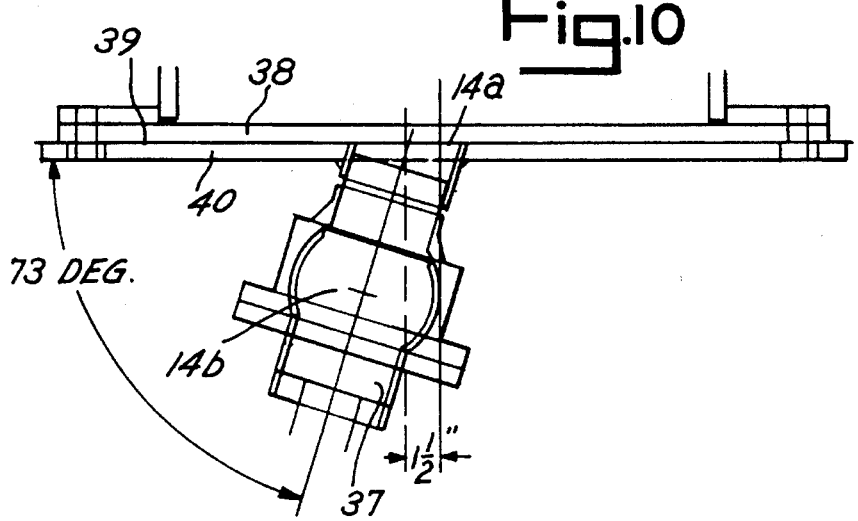
Figure 11:
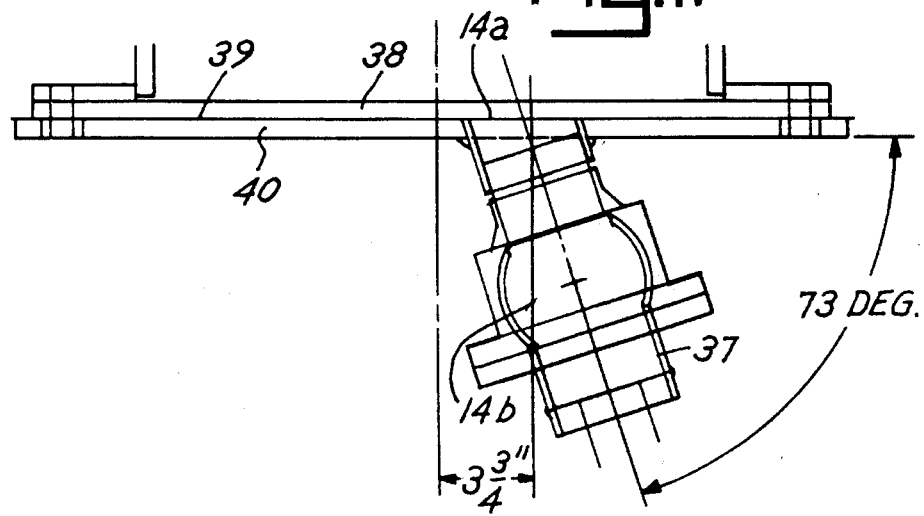
Figure 12:
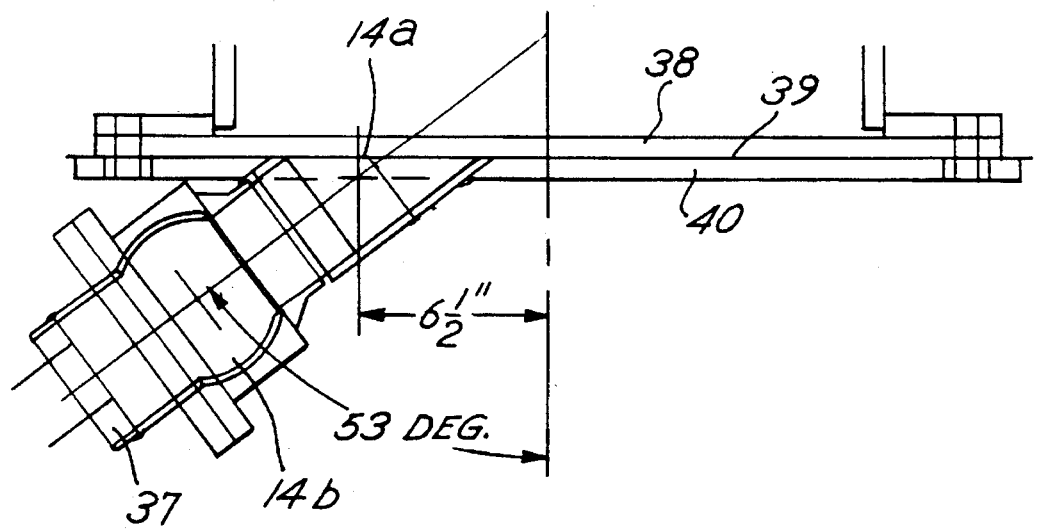
Figure 13:
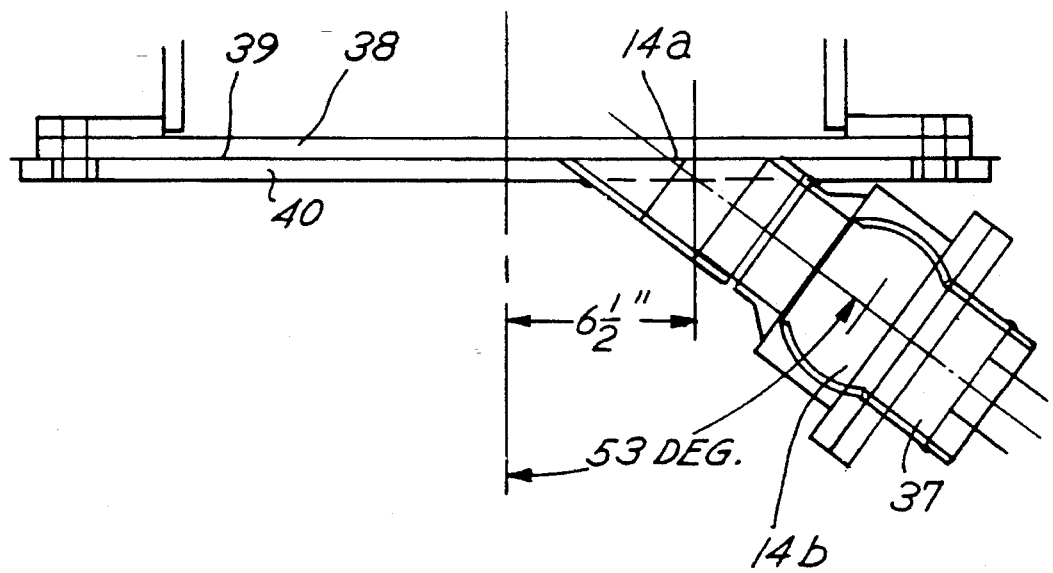
Figure 17:
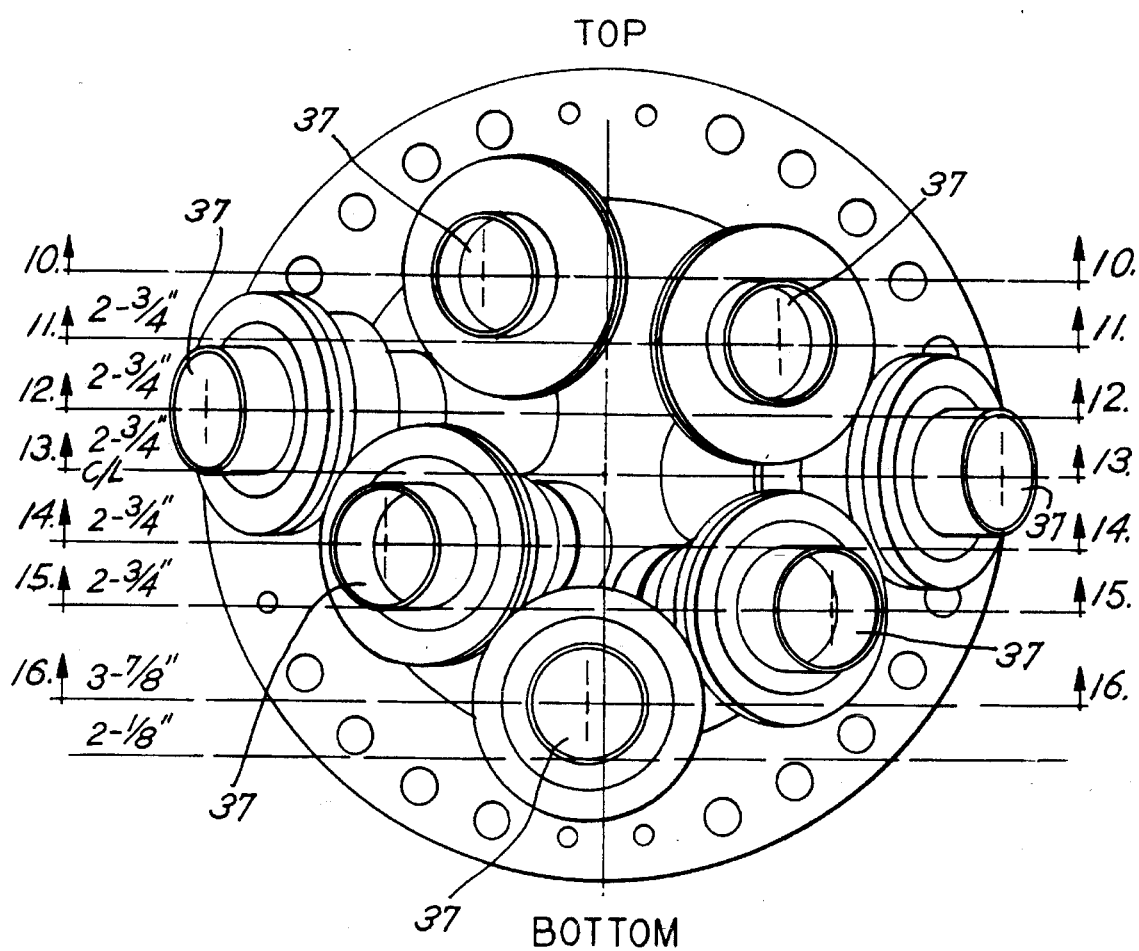
FIG. 17 is an end view a number of injection wands inserted through a manway cover plate of a tank in the preferred embodiment of the invention as shown in FIGS. 10 through 16, taken from the viewpoint from the outside of the manway cover plate and towards the center of the tank.

As shown in FIG. 9, nozzle 36 has a straight narrowed outlet 36a so that the treating solution 20 or the admixture (when the circulating stream 11a is added to the treating solution 20) is injected into the tank at a higher velocity than it otherwise would be, thus increasing the stirring of the tank contents.

These nozzle structures are the preferred structures of the present invention. However, those of skill in the art will readily recognize that other structures are contemplated.

An alternative preferred embodiment is shown in FIGS. 10 through 17. In FIGS. 10 through 17, injection wands 37 can be inserted into a tank at various angles and through openings 14a in a manway cover plate 38. In this preferred embodiment, the angles and openings are designed to accomplish effective mixing of the treating solution or admixture and the contents of the tank. By making openings in a manway cover plate using conventional tap methods and packing glands, the injection wands can be placed into the tank without taking the tank out of service and/or emptying the tank contents in order to insert the wands into the tank. It is believed that by specifically making the openings in a manway cover plate rather than at another location(s) around the tank, permits the practice the invention to be easier, safer, and more economical.

The injection wands 37 are each connected to a corresponding joint 14b that allows for an angle between each wand relative to the tank bottom to be altered and/or allows for an angle between each wand relative to the wall of the tank to be altered. These joints can be socket type ball joints. Further, the radial distance of each injection wand 37 into the tank can be altered as desired to accomplish effective mixing of the treating solution or admixture and the contents of the tank.

As shown in FIGS. 10–17, holes 14a can be made at manway cover plate 38. These holes 14a can be made using conventional tap methods and packing glands so that the injection wands 37 can be inserted through holes 14a and into the tank without having to take the tank out of service or emptying the contents of the tank. Preferably, making this embodiment includes preparing the manway cover plate 38 by cleaning and smoothing its surface, e.g. cleaning with wire brushing. Next, a full face gasket 39 is placed over manway cover plate 38, and a second plate 40 is hot-bolted over manway cover plate 38. Preferably, second plate 40 has properly sized holes 14a for the wands before it is hot-bolted to manway cover plate 38. Then, the combination is pressure tested. Next, holes 14a can be made in manway cover plate 38 using conventional tap methods. Then, the injection wands 37 can be inserted through a conventional packing assembly and into a conventional valve. The valve can then be opened and the injection wands can be inserted through the joint 14b and then inserted through holes 14a in second plate 40 and then inserted through the holes 14a in manway cover plate 38.

The foregoing detailed description of the invention has been made in general terms and with respect to several preferred embodiments. Many of the preferred apparatuses and methods stated herein may be varied by persons skilled in the art without departing from the spirit and scope of the present inventions as set forth in the following claims.

What is claimed is:

1. An apparatus for the treatment of liquids, comprising:
   at least one rigid injection wand inserted through a single opening in a wall of a tank, said tank having a bottom and containing a liquid containing sulfides to be treated, wherein said injection wand is connected to a joint outside of the tank that allows for the angle between the injection wand and the tank bottom or the angle between the injection wand and the wall of the tank to be altered incrementally and in a controlled manner, and at least one location on said injection wand whereby a treating solution can be injected into the tank to promote reaction mixing between the injected treating solution and the liquid containing sulfides being treated.

2. The apparatus of claim 1 wherein the joint is a socket type ball joint.

3. The apparatus of claim 1 further comprising more than one injection wand inserted through the same opening in said wall of said tank.

4. The apparatus of claim 1 including means for mixing the treating solution with a circulating stream of liquid being treated to form an admixture which can be injected into the tank through said injection wand.

5. The apparatus of claim 4 further comprising monitoring and controlling means for measuring the temperature of the circulating stream of liquid being treated and the temperature of the admixture before injection of the admixture into the tank and maintaining the difference between the measured temperatures within a desired temperature range by controlling the amount of injection of the treating solution.

6. The apparatus of claim 5 wherein the means for monitoring and controlling the treatment of the liquid includes maintaining the desired temperature range to about less than 15° F.

7. An apparatus for the treatment of a liquid containing sulfides, comprising:

at least one rigid injection wand inserted through a single opening in a wall of a tank, said tank having a bottom and containing a liquid containing sulfides to be treated, wherein said injection wand is connected to a joint outside of the tank that allows for the angle between the injection wand and the tank bottom or the angle between the injection wand and the wall of the tank to be altered incrementally and in a controlled manner, and at least one location on said injection wand whereby a treating solution can be injected into the tank to promote reaction mixing between the injected treating solution and the liquid containing sulfides until the sulfides are reduced to a desired level.

8. The apparatus of claim 1 further comprising means for moving the injection wand to alter the angle between said injection wand and the tank bottom or the angle between the injection wand and the wall of the tank.

9. The apparatus of claim 1 wherein said opening in the wall of the tank is at a manway cover plate.

10. The apparatus of claim 1 wherein the location on said injection wand comprises a nozzle having a narrowed outlet.

11. The apparatus of claim 10 wherein the narrowed outlet points out from the center of the tank and downward at about a 45° degree angle from the nozzle.

12. The apparatus of claim 10 wherein the narrowed outlet points in towards the center of the tank and downward at about a 45° degree angle from the nozzle.

* * * * *